(12) United States Patent
Johnson

(10) Patent No.: US 8,057,045 B2
(45) Date of Patent: Nov. 15, 2011

(54) STAR FIELD PROJECTION APPARATUS

(75) Inventor: Randy E. Johnson, Escondido, CA (US)

(73) Assignee: Bliss Holdings LLC, Escondido, CA (US)

( * ) Notice: Subject to any disclaimer, the term of this patent is extended or adjusted under 35 U.S.C. 154(b) by 197 days.

(21) Appl. No.: 12/540,069

(22) Filed: Aug. 12, 2009

(65) Prior Publication Data

US 2009/0303448 A1 Dec. 10, 2009

Related U.S. Application Data

(63) Continuation of application No. 11/726,978, filed on Mar. 23, 2007, now Pat. No. 7,641,345.

(60) Provisional application No. 60/815,747, filed on Jun. 21, 2006.

(51) Int. Cl.
*G03B 21/14* (2006.01)
*G03B 21/26* (2006.01)
*G09B 23/00* (2006.01)
*G09B 27/00* (2006.01)
*F21S 6/00* (2006.01)

(52) U.S. Cl. ............ 353/20; 353/28; 353/122; 434/284; 434/285; 362/121

(58) Field of Classification Search .................... 353/20, 353/28, 122; 434/286, 284, 285, 287; 362/121
See application file for complete search history.

(56) References Cited

U.S. PATENT DOCUMENTS

| 4,588,384 A * | 5/1986 | Shiba .......................... 434/286 |
| 2003/0179376 A1* | 9/2003 | Houde-Walter et al. ...... 356/399 |
| 2005/0195456 A1* | 9/2005 | Houde-Walter et al. ........ 359/15 |

* cited by examiner

*Primary Examiner* — Georgia Y Epps
*Assistant Examiner* — Magda Cruz
(74) *Attorney, Agent, or Firm* — Gray Law Firm; Gordon E. Gray, III

(57) ABSTRACT

A projection apparatus for generating a moving star field and a cloud-like effect comprises a means for generating a cloud-like effect using at least one non-coherent light source, a means for generating a moving star field using at least one coherent light source and a means for regulating and supplying electric power. The means for generating cloud-like effect using at least one non-coherent light source comprises at least one pair of condenser lenses and an interferential filter wheel rotated by a motor, disposed between at least one pair of condenser lenses. The means for generating the moving star field using a coherent light source comprises a grating wheel rotated by a motor and a diffractive optical element disposed between the at least one coherent light source and the grating wheel.

13 Claims, 1 Drawing Sheet

STAR FIELD PROJECTION APPARATUS

CLAIM OF PRIORITY

This application is a continuation of U.S. patent application Ser. No. 11/726,978, filed Mar. 23, 2007, now pending, which claims the benefit of U.S. Provisional Application No. 60/815,747, filed Jun. 21, 2006, now abandoned.

FIELD OF INVENTION

Projection light apparatus.

BACKGROUND OF INVENTION

Projection apparatuses are employed in home, office, architectural lighting, and planetarium applications etc. Several projection apparatuses have been developed in the art. U.S. Pat. No. 7,004,588 to Sadler discloses a planetarium projector comprising a point light source having substantially symmetric light intensity and an apparent cross-section of less than about 2 mm which is capable of generating a beam of high-intensity light having a certain cone angle, an enclosure having opaque regions and transparent regions that correspond to locations of individual celestial stars, wherein the enclosure includes an inner surface and an outer surface, and a light dispersing lens assembly disposed within the enclosure. The projector also includes a portable point light source comprising a light source, a light collection element and a light conducting conduit suitable for use in providing high intensity light with a small cross-sectional area.

U.S. Pat. No. 5,082,447 to Hinkle discloses a star projection device formed from an opaque film sheet folded to form a six-sided, cubical enclosure, the film having transparent spots extending over its entire area representing star positions when projected onto a surrounding surface, and a small, point-like light source is positioned at the center of the enclosure for projecting light simultaneously through all of its six sides to produce a substantially 360 degrees horizon less projection of the stars onto surrounding surfaces. Nearby stars are represented by linear extensions from the transparent spots representing vectors corresponding to the magnified heliocentric parallax motion of the star.

U.S. Pat. No. 4,776,666 to Kuehn discloses an improved projector for projecting fixed stars in planetarium increasing the brightness and the brilliance of the projected sky by using fiber optical light guides. The device comprises at least one light source, one condenser, one star plate or templates and one lens, which projects the star plate template on the planetarium dome. A fiber optical light guide cable, the light-entry end of which faces the condenser and which consists of fiber optical light guides or fiber optical light guide bundles, is provided between the condenser and the associated star plate or template. The other end of the fiber optical light guide cable is split up into fiber optical light guides and/or fiber optical light guide bundles, the light-emergence ends of which are assigned to the locations on the star plate or template which are to be illuminated.

SUMMARY OF INVENTION

The present invention is projection apparatus that creates a moving star field and a deep blue cloud-like effect. The apparatus mainly comprises coherent and non-coherent light sources and a plurality of optical elements. The coherent light source is a monochromatic laser and the non-coherent light source is a light emitting diode (LED). The means to generate the deep blue cloud-like effect comprises an LED, an interferential filter wheel, inner and outer condenser lenses and a first motor. The interferential wheel is between the inner and outer condenser lenses. The LED is behind the inner lens. The light from the LED passes through the lenses and the interferential wheel. The first motor rotates the interferential filter wheel and this gives an effect of a slowly moving deep blue cloud.

The moving star field generation means comprises a laser, a grating wheel, two diffractive optical elements and a second motor. The diffractive optical elements are between the grating wheel and the lasers. The light from the laser passes through the diffractive optical elements and the grating wheel as the second motor rotates the grating wheel to create a moving star field effect. A power supply and regulation means controls the operation of the motor and the light sources.

DETAILED DESCRIPTION

Figure 1:
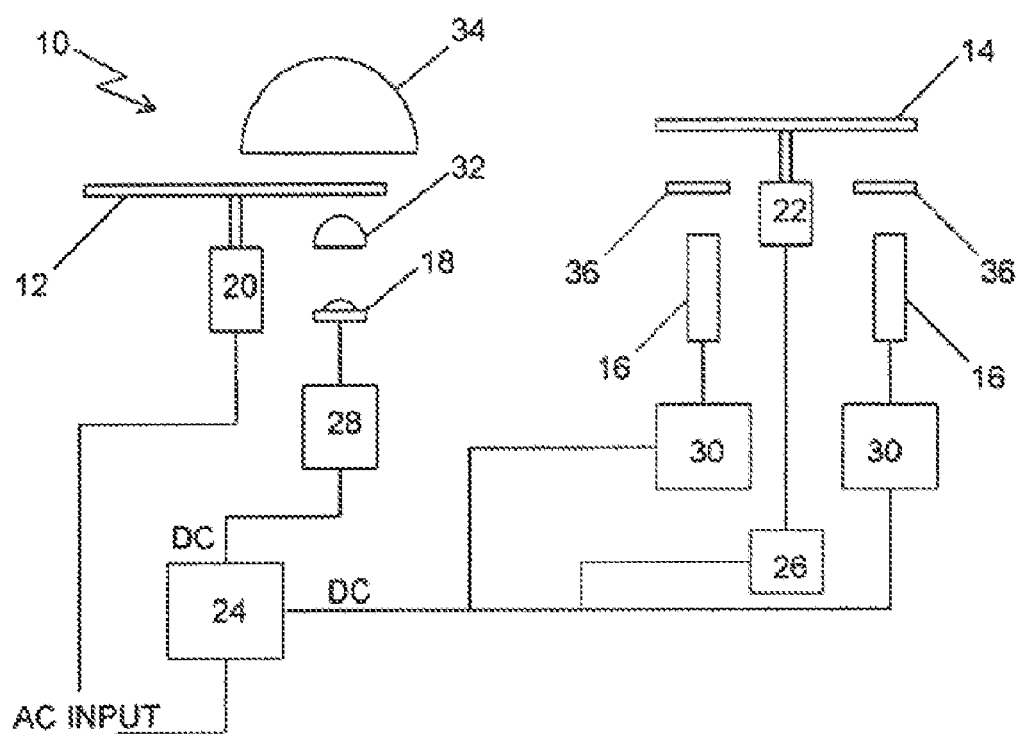
FIG. 1 is a functional block diagram of the star field projection apparatus of the present invention.

Referring to the drawing, a preferred embodiment of a star field projection apparatus of the present invention is illustrated and generally indicated as in FIG. 1. The present invention produces a moving star field along with a deep blue cloud-like effect.

Referring to FIG. 1, the star field projection apparatus 10 comprises coherent and non-coherent light sources, a power supply and regulation means, a pair of condenser lenses, inner 32 and outer 34, an interferential wheel 12, a grating wheel 14, a pair of diffractive optical elements 36 and a pair of motors. The coherent light source comprises a monochromatic laser 16 and the non-coherent light sources comprise a pair of light emitting diodes (LED) 18.

The power supply and regulation means comprise an alternating current supply, a full wave bridge rectifier and filter circuit 24, a motor current control unit 26, an LED current regulator 28 and a laser diode power supply 30. The alternating current input is rectified and filtered by the full wave bridge rectifier and filter circuit 24 to get a desired direct current output. The direct current output is fed to the LED current regulator 28, laser diode power supply 30 and the motor current control 26.

The arrangement comprising the LED 18, first motor 20, interferential filter wheel 12 and inner 32 and outer condenser lenses 34 create a deep blue cloud-like effect. The interferential filter wheel 12 is positioned between the inner 32 and outer 34 lenses as shown in FIG. 1. The outer lens 34 is bigger than the inner lens 32. In one embodiment, a 50 mm condenser lens is used for the outer lens 34 and a 10 mm condenser lens is used for the inner lens 32. The interferential filter wheel 12 is rotated by the first motor 20. The beam of light from the LED 18 passes through the inner lens 32 and the rotating interferential filter wheel 12, and is eventually collected and redirected by the outer condenser lens 34 to create a cloud-like effect. The cloud has a slow motion because of the periodic rotation of the interferential filter wheel 12. The cloud is of deep blue color but can be produced in other colors and with other characteristics.

Still referring to FIG. 1, the star field motion is produced by using the grating wheel 14, a second motor 22, the diffractive optical elements 36 and the lasers 16. The second motor 22 is used for rotating the grating wheel 14. The motor current control unit 26 controls the operation of the second motor 22.

The diffractive optical elements 36 are positioned between the grating wheel 14 and the lasers 16. The light beam from the lasers 16 passes through the diffractive optical elements 36. The light output from the diffractive optical elements 36 passes through the rotating grating wheel 14 to generate bright spots because of the interference of the diffracted light beams. The bright spots generated appear as stars. The periodic rotation of the grating wheel 14 causes the motion of the star field. The motor control unit is used to control the speed or rpm of the second motor. The stars are layered on the deep blue cloud.

All features disclosed in this specification, including any accompanying claims, abstract, and drawing, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. .sctn.112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A projection apparatus, comprising:
   at least one diffractive optical source;
   at least one coherent light source, the at least one coherent light source positioned to direct light through the at least one diffractive optical source when power is supplied thereto;
   a power supply, wherein the at least one coherent light source and the at least one diffractive optical source generate a star field when supplied with power from the power supply;
   a grating wheel, wherein the at least one diffractive optical source is positioned between the at least one coherent light source and the grating wheel; and
   a first motor for rotating the grating wheel, wherein the at least one coherent light source, the grating wheel, the at least one diffractive optical source, and the first motor are adapted to generate a moving star field when supplied with power from the power supply.

2. The projection apparatus of claim 1, wherein the moving star field is caused by the periodic rotation of the grating wheel.

3. The projection apparatus of claim 1, further comprising, a motor control unit for controlling the speed or rpm of the first motor.

4. The projection apparatus of claim 1, wherein the first motor comprises a DC motor and power is supplied to the first motor through a full wave bridge rectifier and filter.

5. The projection apparatus of claim 1, further comprising, a second condenser lens wherein the first and second condenser lenses comprise an outer condenser lens and an inner condenser lens and wherein, when in operation, light from the at least one non-coherent light source passes through the inner condenser lens and the rotating interferential filter wheel, and is eventually collected and redirected by the outer condenser lens to create the cloud-like effect.

6. A projection apparatus, comprising:
   at least one diffractive optical source;
   at least one coherent light source, the at least one coherent light source positioned to direct light through the at least one diffractive optical source when power is supplied thereto;
   a power supply, wherein the at least one coherent light source and the at least one diffractive optical source generate a star field when supplied with power from the power supply;
   at least one non-coherent light source;
   a first condenser lens;
   at least one interferential wheel, the at least one inferential wheel positioned between the non-coherent light source and the first condenser lens; and
   a motor for rotating the interferential wheel, wherein the at least one non-coherent light source, the interferential wheel, the first condenser lens, and the motor generate a cloud-like effect when supplied with power from the power supply.

7. The projection apparatus of claim 6, wherein the motor comprises an AC motor.

8. The projection apparatus of claim 6, further comprising, a motor control unit for controlling the speed or rpm of the motor.

9. The projection apparatus of claim 6, wherein the at least one non-coherent light source is a light emitting diode (LED).

10. The apparatus of claim 6, wherein the star field is layered on the cloud-like effect.

11. A method of creating a star field, comprising:
    causing light from a coherent light source to pass through at least one diffractive optical element wherein the at least one coherent light source is positioned to direct light through the at least one diffractive optical source when power is supplied thereto;
    causing light from the coherent light source to pass through a grating wheel; and
    causing the grating wheel to rotate, wherein rotation is effectuated by a first motor attached to the grating wheel.

12. The method of claim 11, further comprising,
    causing light from a non-coherent light source to pass through a first condenser lens and through an inferential wheel, wherein the inferential wheel is positioned between the non-coherent light source and the pair of condenser lens; and
    causing the inferential wheel to rotate, wherein rotation is effectuated by a second motor attached to the inferential wheel and wherein the light from the non-coherent light source passing through the first condenser lens and the inferential wheel creates a cloud-like effect.

13. The method of claim 12, further comprising, causing light from the non-coherent light source to pass through a second condenser lens, wherein the first and second condenser lenses comprise an outer condenser lens and an inner condenser lens and wherein, when in operation, light from the at least one non-coherent light source passes through the inner condenser lens and the rotating interferential filter wheel, and is eventually collected and redirected by the outer condenser lens to create the cloud-like effect.

* * * * *